3,008,903
ALKALISILICATE-CONTAINING STABLE ADDITION PRODUCTS OF SODIUM HYPOCHLORITE AND TRISODIUM PHOSPHATE-12-HYDRATE
Valentin Habernickel, Dusseldorf, and Josef Huppertz, Dusseldorf-Holthausen, Germany, assignors to Henkel & Cie. G.m.b.H., Dusseldorf-Holthausen, Germany, a corporation of Germany
No Drawing. Filed Nov. 13, 1957, Ser. No. 696,069
Claims priority, application Germany Nov. 16, 1956
18 Claims. (Cl. 252—187)

This invention relates to alkalisilicate-containing, stable, addition products of sodium hypochlorite and trisodium phosphate-12-hydrate, and is a continuation-in-part of my co-pending application, Serial No. 582,327, filed May 3, 1956, now abandoned.

Readily soluble hypochlorite-containing trisodium phosphates are being used as bleaching agents, disinfectants, and cleaning agents to an increasing extent. Frequently these materials are used in combination with alkalisilicates.

It is known that trisodium phosphate forms a double salt with sodium hypochlorite, the formula of which may be written $(Na_3PO_4 \cdot 12H_2O)_n \cdot NaOCl$, in which $n$ is a number between 4 and 5. The double salt may be formed by allowing molten triphosphate-12-hydrate and sodium hypochlorite to solidify, or by adding sodium metasilicates to molten trisodium phosphate, followed by the addition of sodium hypochlorite solutions. When double salts are formed by these known processes, however, the same are not particularly well suited for use as washing, bleaching, or disinfecting agents, since the same are very unstable in mixtures with alkali, and do not keep upon storage, since the chlorine content rapidly drops. While it is possible to obtain hypochlorite-containing trisodium phosphates by crystallization from solutions, the same disadvantages are present, or else such cumbersome and costly methods are required, that the practical application is restricted from an economic standpoint.

Additionally, it has been found that trisodium phosphate-12-hydrate will preferentially form a double salt with alkali compounds, such as $NaNO_2$, $NaCl$, $NaOH$, etc., as compared with the double salt formation with the hypochlorite. Thus, for example, the double salt formation with sodium hydroxide will preferentially occur as compared with the corresponding double salt formation with the hypochlorite compound. Since most of the commercially available trisodium phosphate-12-hydrate is in the form of a sodium hydroxide-trisodium phosphate-12-hydrate complex, the formation of the desired hypochlorite complex cannot occur, or else occurs only to a limited extent upon the addition of an alkaline hypochlorite solution.

One object of this invention is to overcome the above-mentioned disadvantages.

A further object of this invention is the production of an alkalisilicate-containing addition product of sodium hypochlorite and trisodium phosphate-12-hydrate, which has a practically unlimited storage life. This, and still further objects, will become apparent from the following description.

In accordance with the invention it has surprisingly been discovered that alkalisilicate-containing addition products of sodium hypochlorite and trisodium phosphate-12-hydrate, which are stable, i.e., which do not show a substantial loss of chlorine content upon storage, may be formed if disodium phosphate is contacted with a preformed solution of alkali water glass and sodium hypochlorite at a temperature sufficient to maintain the mixture in the molten state and thereafter allowing the molten reaction product formed to solidify by cooling, preferably followed by comminution. The starting preformed solution in this connection must have an alkali content, which has been adjusted to the formation of $Na_3PO_4$, and of an alkali silicate having an $SiO_2:Na_2O$ ratio between about 2.5–6:1, and preferably 3.5–4.5:1, in the final product formed upon the reaction with the disodium phosphate.

The alkaline water glass used in the process of the invention provides the alkali necessary for the conversion of the disodium phosphate. Very surprisingly, however, the alkaline water glass acts in an entirely different manner from other alkaline materials conventionally used for the conversion of disodium phosphate into trisodium phosphate. The alkalisilicate complex apparently continuously resupplies alkali for the conversion of the disodium phosphate into the trisodium phosphate as the reaction progresses without a liberation of the entire alkali content. In contrast thereto, when using other alkali material, such as soda, borates, or sodium hydroxide, the entire alkali content is liberated upon the addition, so that not only does the desired reaction take place, but also an undesired sodium hydroxide trisodium phosphate-12-hydrate complex formation occurs.

In order to obtain the desired solubility in the end product, it has been found advisable to effect the reaction in such a manner that the end product contains an alkalisilicate having an $SiO_2:Na_2O$ ratio of between 2.5–6:1, and preferably 3.5–4.5:1.

The quality of alkali silicate in the end product furthermore depends on the specific water glass composition used. If there is used an alkaline water glass of a molecular ratio of $SiO_2$ to $Na_2O$ of more than 2:1 as alkali supplier for the conversion of the disodium phosphate into the trisodium phosphate, relatively alkali silicate-rich end products are obtained. It is therefore frequently advisable to start with stronger alkaline water glasses. In actual practice, suitable solutions can also be prepared by the addition of alkali to commercial water glass solutions, these solutions then being used for the purpose of the invention. The quantity of water which these solutions contain should be between 20 and 60%. The entire quantity of water present should, however, be so adjusted that it does not exceed the quantity necessary for the formation of the trisodium phosphate-12-hydrate, or, at most, only exceeds it slightly.

The contacting of the solution of hypochlorite and alkali silicate with the disodiumphosphate takes place at temperatures from 15 to 80° C., preferably at temperatures not over 75° C. However, the temperatures must be so high that the mixture at all times remains liquid.

It has been found advantageous for practical operation to maintain the amount of alkali silicate within such limits that it does not exceed about 25% in the end product. The amount of alkali silicate in the starting material is therefore between 5 and 30%, preferably 10–25%. The $SiO_2:Na_2O$ ratio of the alkali silicate, which is used as starting material and can also be prepared by addition of alkali to commercial water glass solutions, should be between 0.8:1 and 2.09:1. This then leads to products which contain 75% and more hypochlorite-containing trisodium phosphate. The active chlorine content of these products is at least 2.2% and is generally above 2.5%.

When operating with the disodium phosphate, it has been found that the reaction may be retarded in certain cases by the relative insolubility of this salt in the reaction mixture. Additionally, since the disodium phosphate, similar to the trisodium phosphate, forms a 12-hydrate, the possibility exists that the disodium phosphate will prematurely crystallize into disodium phosphate 12-hydrate, prior to the formation of the trisodium phosphate, which is a necessary component of the addition product in accordance with the invention.

Furthermore, it has been found, depending upon the size and nature of the reaction vessels when using anhydrous disodium phosphate, the heat of hydration or the heat of neutralization for the trisodium phosphate is not always sufficient to maintain the necessary melting temperatures of 65–75° C. or to maintain them until the completion of the reaction without supplying external heat.

In accordance with a preferred embodiment of the invention, these disadvantages are avoided by replacing the disodium phosphate in whole or in part with monosodium phosphate, phosphoric acid, or mixtures thereof. Thus, the preformed solution of alkaline water glass and sodium hypochlorite may be contacted with the disodium phosphate, the monosodium phosphate, the phosphoric acid, or any desired combination of these components. It is also possible to add any of these components individually one after the other in suitable quantities.

When replacing the disodium phosphate in whole or in part with the monosodium phosphate and/or the phosphoric acid, the reaction is effected in identical manner as described in connection with the disodium phosphate with the solution containing an amount of alkali sufficient for the formation of $Na_3PO_4$ and an alkali silicate having an $SiO_2:Na_2O$ ratio between about 2.5–6:1, and preferably 3.5–4.5:1 upon reaction with the disodium phosphate and/or the monosodium phosphate and/or the phosphoric acid.

When using the monosodium phosphate and/or phosphoric acid in place of at least a portion of the disodium phosphate, a considerably greater amount of heat of neutralization is generated, so that operation may be reliably effected without any external supply of heat. The relatively better solubility of the monosodium phosphate prevents a premature crystallization of disodium phosphate-12-hydrate, particularly since the monosodium phosphate itself is not capable of forming a higher hydrate.

Although the end of products obtained in accordance with the invention frequently correspond in their analyses to mixtures of hypochlorite-containing sodium phosphate and water glass, to which the latter is subsequently added, the products in accordance with the invention are entirely different from these conventional materials, in that they are highly stable upon storage, whereas the conventional materials rapidly lose their chlorine content upon storage.

The products obtained in accordance with the invention are therefore vastly superior to conventional products with respect to their high stability and unlimited storage life in connection with their chlorine content. Materials produced in accordance with the invention are well suited as disinfecting, bleaching, and cleaning agents, and are particularly suitable for use with alkali-sensitive metals, such as aluminum and tin, in which connection the alkali silicate simultaneously acts to prevent corrosion. The products obtained in accordance with the invention may be mixed, if desired, with other known materials in the washing and cleaning industry and employed in this form.

When these materials, however, are mixed with anhydrous phosphates, and particularly those which are derived from meta- or poly-phosphoric acids, this stability is substantially reduced in that the chlorine content decreases upon storage.

By the term "anhydrous phosphates" there is understood such phosphates which may be obtained by condensation of salts of orthophosphoric acid under separation of water. For example, $$2Na_2HPO_4 + NaH_2PO_4 \rightarrow Na_5P_3O_{10} + 2H_2O$$

or $3NaH_2PO_4 \rightarrow (NaPO_3)_3 + 3H_2O$ and so on. Such salts are therefore, for example, $Na_4P_2O_7$, $Na_2H_2P_2O_7$, $Na_5P_3O_{10}$, $Na_6P_4O_{13}$, $(NaPO_3)_3$, $(NaPO_3)_x$ in which $x$ is more than 3 having no upper limit. Phosphates of the last type include hexametaphosphates, madrell'sche salt, currol'sche salt, and graham salt. Many of these anhydrous phosphates can, however, contain water of crystallization. By the term "hydrated" form as used herein, there is understood these compounds, with water of crystallization.

It has now further been found that these disadvantages can be avoided if the anhydrous phosphates, and particularly the alkali salts of meta- and poly-phosphoric acids, are added to the melt of the other components before they are allowed to solidify with cooling. The anhydrous phosphates are preferably added last to the already prepared melt. The anhydrous phosphates can be added in this connection in hydrated, partially hydrated, or else anhydrous form. It has, however, been found that it is particularly advantageous if partially hydrated or anhydrous phosphates without water of crystallization are added and the melt contains as much water as is necessary for the hydrating of polymeric phosphate, so that hydrated anhydrous polyphosphates, such as $Na_5P_3O_{10}.6H_2O$ can form or be present in the final product. If this is not taken into consideration from the very start in connection with the preparation of the melt of the other components, the addition of the necessary quantity of water is preferably effected prior to the addition of the anhydrous phosphates.

The addition of the anhydric phosphates to the melt should preferably take place at temperatures of about 60–75° C. In general, it is not necessary to supply additional heat to the melt during the addition, since this heat is supplied by the heat of hydration produced. Temperatures above 75° C. should as far as possible, be avoided, since this leads, on the one hand, to considerable losses of chlorine, particularly in case of long times of stay of the melt in the hot reaction vessel, and, on the other hand, to a conversion of the anhydrous phosphates, so that the value of the end product is considerably reduced. The quantity of melted water glass and anhydrous phosphates can be varied as desired. In general, however, the amount of water glass should be 5–30%, the amount of anhydrous phosphate should be about 5–50%, and the remainder should be the addition product of sodium hypochlorite and trisodium phosphate-12-hydrate. In order to obtain an end product having a relatively high chlorine content, not more than 10–20% anhydrous phosphates, and about 5–15% water glass are employed. Such products still have a content of active chlorine of more than 2.5%. Instead of a given anhydrous phosphate, mixtures of different anhydrous phosphates may also be added, such as, for example, pyrophosphate plus tripolyphosphate, hexametaphosphate plus tripolyphosphate, tetrapolyphosphate plus pyrophosphate, etc., in which connection, however, the percentage of the individual anhydrous phosphates must be taken into account when determining the water content.

The technical effect which can be obtained by the addition of the anhydrous phosphates in accordance with the above will be clear from the following tables. There are compared therein products of hypochlorite-containing trisodium phosphate with melted water glass, to which sodium tripolyphosphate has been added or mixed in various manners, and the active chlorine content found at the beginning and after several weeks of storage is set forth.

I. Products of:
  80% hypochlorite-containing trisodium phosphate
  10% water glass
  10% tripolyphosphate The latter was—

| Active chlorine content at the beginning and after—weeks | (a) Admixed as anhydrous $Na_5P_3O_{10}$ | (b) Admixed as $Na_5P_3O_{10}.6H_2O$ | (c) Melted anhydrous $Na_5P_3O_{10}$; melt contains no water for the hydration of the $Na_5P_3O_{10}$ | (d) Same as (c) but melt contains water for hydration to $Na_5P_3O_{10}.6H_2O$ |
|---|---|---|---|---|
| 0 | 2.60 | 2.50 | 2.65 | 2.60 |
| 1 | 2.20 | 2.30 | 2.40 | 2.60 |
| 2 | 2.00 | 2.10 | 2.30 | 2.60 |
| 3 | 1.40 | 1.90 | 2.30 | 2.58 |
| 4 | 1.10 | 1.81 | 2.20 | 2.57 |
| 5 | 0.70 | 1.50 | 2.00 | 2.57 |
| 6 | 0.20 | 1.20 | 1.80 | 2.56 |

II. Products of:
  80% hypochlorite-containing trisodium phosphate
  5% water glass
  15% tripolyphosphate The latter was—

| Active chlorine content at the beginning and after—weeks | (a) Admixed as anhydrous $Na_5P_3O_{10}$ | (b) Admixed as $Na_5P_3O_{10}.6H_2O$ | (c) Melted anhydrous $Na_5P_3O_{10}$; melt contains no water for the hydration of the $Na_5P_3O_{10}$ | (d) Same as (c) but melt contains water for hydration to $Na_5P_3O_{10}.6H_2O$ |
|---|---|---|---|---|
| 0 | 2.50 | 2.50 | 2.60 | 2.65 |
| 1 | 2.30 | 2.30 | 2.52 | 2.64 |
| 2 | 1.80 | 2.20 | 2.43 | 2.63 |
| 3 | 1.20 | 2.00 | 2.30 | 2.60 |
| 4 | 0.80 | 1.70 | 2.00 | 2.58 |
| 5 | 0.60 | 1.40 | 1.82 | 2.58 |
| 6 | 0.20 | 1.10 | 1.40 | 2.56 |

The following examples are given by way of illustration and not limitation:

EXAMPLE 1

80 kilograms sodium water glass (58/60 Baumé, molectular ratio $SiO_2/Na_2O=2.08$) and 49 kg. 30.8% caustic soda solution (corresponding to 11.7 kg. $Na_2O$) are mixed for about 10 minutes at room temperature in a vessel provided with an agitator, whereupon 51 liters of hypochlorite solution containing 146 grams of chlorine per liter are added. Thereupon, while continuing to stir, 96 kg. disodium phosphate (water content 8.5%) are added in such a manner that the mixture at all times remains liquid, due to the temperature rise resulting from the heat of reaction. The final temperature in this connection is about 70 to 75° C. The melt obtained in this manner is thereupon discharged onto a cooling unit and ground after it has solidified. The yield is 272 kg. and the active chlorine content 2.6%. Furthermore, 13.3% alkali silicate (mol ratio $SiO_2/Na_2O=4.3$) is present in the end product.

The stability of the product obtained in this manner can be noted from the following table.

Table 1

| Storage life in months | 1 | 2 | 4 | 6 | 8 | 10 |
|---|---|---|---|---|---|---|
| Percent active chlorine | 2.6 | 2.58 | 2.51 | 2.50 | 2.50 | 2.50 |

In Table 2 there are, furthermore, compared products which were obtained on the one hand in accordance with the manner of procedure described in Example 1, paragraph 1, and, on the other hand, by the addition of sodium hypochlorite to already formed triphosphate-12-hydrate, followed by the addition of water glass to the still liquid melt.

Table 2

| Batch | Example 1 | Comparative Product 1 | Comparative Product 2 |
|---|---|---|---|
| kg. water glass | 80.0 | 80.0 | 72 |
| kg. NaOH | 15.13 | 22.1 | 13.5 |
| kg. bleaching powder liquor | 62.0 | 88 | 72 |
| kg. disodium phosphate | 96.0 | 100 | 88 |
| Percent $Cl_2$ in melted product | 2.3 | 2.34 | 2.7 |
| Percent sodium silicate in melted product | 13.3 | 13.0 | 12.6 |
| Sodium silicate ratio in melted product | 4.2 | 2.5 | 4.90 |
| Stability, percent $Cl_2$: | | | |
| Beginning | 2.6 | 2.34 | 2.7 |
| After 1 month | 2.6 | 1.50 | 1.70 |
| After 2 months | 2.58 | 1.10 | 0.77 |
| After 3 months | 2.56 | 0.40 | 0.31 |
| After 4 months | 2.51 | --------- | 0.14 |

EXAMPLE 2

72 kg. sodium water glass (58/60 Baumé, mol ratio $SiO_2/Na_2O=2.08$), 36.4 kg. caustic soda solution (containing 10.4 kg. $Na_2O$) as well as 56 liters hypochlorite solution with 125 g. $Cl_2$/liter, and also 88 kg. disodium phosphate are worked in the manner described in Example 1. The melted product obtained in this manner contains 2.52% active chlorine, which, after a storage period of 5 months, still amounts to 2.4%. The alkali silicate content of the melted product is 12.4% with a mol ratio of $SiO_2/Na_2O$ of 4.7.

With an aqueous solution (1%) of this product soiled aluminum cans of milk are treated for 5 minutes at a temperature of 50° C. The cans are then rinsed with water, and as a result of the treatment, are shining and sterile without any corrosion to the metal.

EXAMPLE 3

To a mixture of 300 kg. sodium water glass (58–60 Baumé, mol ratio $SiO_2/Na_2O=2.08$) and 82.2 liters hypochlorite solution with 156 grams $Cl_2$/liter, 142 kg. disodium phosphate are added over the course of 1 hour. After the completion of the reaction, the reaction mixture is caused to solidify by setting it aside with additional cooling, and thereupon it can be easily comminuted. Yield 530 kg. Active chlorine content 2.3%, alkali silicate content 25.4% (mol ratio $SiO_2/Na_2O=4.28$).

EXAMPLE 4

138 kg. sodium water glass (58/60 Baumé, mol ratio $SiO_2/Na_2O=2.08$) and 80 kg. caustic soda solution (corresponding to 16.2 $kg_2Na_2O$) are mixed for 10 minutes in a vessel provided with an agitator. After the addition of 84.7 liters of hypochlorite solution containing 145 grams $Cl_2$/liter 150 kg. of diphosphate are slowly added over the course of 1 hour. The melt is placed on a cooling unit and ground after solidification. The yield is 458 kg., the active chlorine content 2.61%, which reduces to 2.51% after storage for 5 months, and the alkali silicate content is 13.3% (mol ratio $$SiO_2/Na_2O=4.42).$$

EXAMPLE 5

50 kg. sodium water glass (58/60° Baumé, ratio $SiO_2/Na_2O=2.02$) and 67 kg. of 40% caustic soda solution are mixed in a vessel provided with an agitator for about 10 minutes at room temperature and 105 liters hypochloritie solution containing about 140–150 grams $Cl_2$/liter are stirred into the alkaline solution formed. Finally, 10 liters of water are added to the solution and it is again vigorously stirred. 113.5 kg. of anhydrous disodium-orthophosphate are now added over the course of 10–15 minutes with continued stirring. The temperature slowly rises and reaches a maximum of 70–74° C. As soon as a temperature rise can no longer be noted, 56 kg. of sodium tripolyphosphate (anhydrous) are rapidly added, and the melt, after the tripolyphosphate has been stirred well, is immediately removed to a cooling unit.

There are obtained about 400 kg. melted product containing about 5% water glass of an $SiO_2/Na_2O$ ratio of 3.5; 14% tripolyphosphate-6-hydrate and 3.4% active chlorine.

EXAMPLE 6

13 kg. sodium water glass (58/60° Baumé, $$SiO_2/Na_2O=2.02)$$

and 17.6 kg. of 40% caustic soda solution are mixed in a vessel provided with an agitator and 24.1 liters of hypochlorite solution containing about 140–150 grams $Cl_2$ per liter are stirred into this solution. 29.5 kg. anhydrous disodium orthophosphate are thereupon slowly added while stirring. The temperature in this connection increases to 70–75° C. As soon as no further temperature rise occurs, 14.5 kg. anhydrous sodium tetrapolyphosphate are added with vigorous stirring, and the melt, after it has been well mixed, is immediately discharged onto a cooling unit.

After cooling, there are obtained about 105 kg. melted product of the following composition:

| | |
|---|---|
| Active chlorine content | 3.90%. |
| Water glass content | 5% $SiO_2/Na_2O$ ratio=3.55. |
| Tetrapolyphosphate content | 14.8% as $Na_6P_4O_{13}.4H_2O$. |

The active chlorine content dropped after three months to 3.80%. Aqueous solution (2–3%) of this product is well suited for use as washing for utensils and plates.

EXAMPLE 7

90 kg. sodium water glass (58/60° Baumé, $$SiO_2/Na_2O \text{ ratio}=2.02)$$

are stirred in a vessel provided with an agitator with 28 kg. hypochlorite solution containing 140–150 grams chlorine/liter, and after a short period of time, 28.4 kg. anhydrous disodiumorthophosphate ($Na_2HPO_4$) are added. Stirring is continued until no further rise in the temperature can be noted (max. 70° C.), whereupon 80 kg. technical tetrapolyphosphate of the composition $Na_6P_4O_{13}$ are added. The melt is immediately discharged to the cooling unit and ground after cooling.

There are obtained about 225 kg. melted product of the following analysis:

| | |
|---|---|
| Active chlorine | 1.7%. |
| Water glass | 18.5% $SiO_2/Na_2O$ ratio=3.22%. |
| Tetrapolyphosphate hydrate | 40.0%. |

EXAMPLE 8

142 kg. sodium waterglass (58/60° Baumé), 35.8 kg. caustic soda solution, and 68 kg. hypochlorite solution are mixed with 130 grams chlorine per liter in a vessel provided with an agitator and 14 grams of ground sodium hydroxide are added over the course of 10–15 minutes. 71 kg. of anhydrous monosodium phosphate is then introduced into the solution in such a manner that the temperature does not exceed 70–75° C. (time about 15 minutes).

After cooling, there are obtained about 330 kg. grindable product containing 2.4% active chlorine, which after a storage period of 6 months still amounts to 2.19%.

EXAMPLE 9

150 kg. sodium waterglass (58/60° Baumé, mol ratio $SiO_2:Na_2O$, 2.02:1) are stirred together with 180 kg. of 40% caustic soda solution, whereupon there are added 315 liters hypochlorite solution containing 148 grams chlorine per liter. 188 kilograms of ground sodium hydroxide are then introduced while stirring. Thereupon 204 kg. $NaH_2PO_4$ (anhydrous) are slowly added while stirring, followed by 78.3 kg. phosphoric acid in such a manner that the temperature does not exceed 80° C. After everything has been mixed, the stirring is continued for 10 minutes and thereupon 168 kg. anhydrous sodium tripolyphosphate is finally introduced into the liquid mixture. The melt is then discharged into a cooling unit after a few minutes.

There are obtained about 1200 kg. melted product having a water glass content of about 5% (mol ratio $SiO_2:Na_2O$, about 3.45:1) and a content of tripolyphosphate of 13%. The active chlorine content of the mixture is 3.1%, which reduces to 2.92% after storage for 6 months.

EXAMPLE 10

A homogeneous mixture is made of:

105 kilograms sodium water glass (58/60 Baumé, molecular $SiO_2/Na_2O=2.02/1$)
126 kilograms 40% caustic soda solution
215 liters hypochlorite solution containing 132 grams of $Cl_2$ per liter
103 kilograms caustic soda, pulverized Thereupon, while stirring, 162.5 kilograms anhydrous disodium phosphate is added slowly without exterior cooling and subsequently also 54.5 kilograms phosphoric acid is worked in. At a temperature of approximately 75° C. 147 kilograms technical hexametaphosphate is added and stirring is continued for a short time. Thereafter the reaction mixture is discharged onto a cooling unit.

The yield is 920 kilograms of the melted product which contains 16% of hexametaphosphate and 4.5% of water glass (molecular ratio $SiO_2/Na_2O=3.36$).

Furthermore the product contains 2.66% of active chlorine which reduces to 2.61% after storage for 2 months.

EXAMPLE 11

While stirring, 102 kilograms of 37% caustic soda solution and 288 liters of hypochlorite solution with a content of 142 grams $Cl_2$ per liter are successively added to 166.5 kilograms of water glass (58/60 Baumé, molecular ration $SiO_2/Na_2O=2.02$), mixing it with 178 kilograms of anhydrous monosodium phosphate and 400 kilograms 40% caustic soda solution and stirring it finally with 200 kilograms of anhydrous disodium phosphate, as well as 122.5 kilograms of phosphoric acid.

As soon as the temperature reaches 78° C., 320 kilograms of technical hexametaphosphate are added and the product is cooled by bringing it immediately onto conveyer belts. Approximately 1750 kilograms of the melted product are obtained, containing 18.30% of hexametaphosphate, 5.50% of water glass (molecular ratio $SiO_2/Na_2O=3.05$) and 2.08% of active chlorine. After storage for 6 weeks the active chlorine content amounts to 2.07%.

The products manufactured as described in the Examples 9–11 are excellent combined detergents for cleaning and disinfecting, especially when used in contact with those metals which are sensitive to alkalies and which are conventionally used in the food industry. Mostly such vessels are made of aluminium, tin or galvanized iron and normally do not resist an alkaline cleaning and corrosion is caused. When using the above described products in a solution of approximately 0.5–3%, even at higher temperatures (approximately up to 80°) and even for prolonged periods, no corrosion on the metal is observed. No deposits are formed due to the hardness of the water when products are applied in an aqueous solution of the above mentioned concentrations.

While the invention has been described in detail with reference to the specific embodiments described, various changes and modifications will become apparent to the

We claim:

1. Process for the production of alkali silicate-containing stable addition products of sodium hypochlorite and trisodium phosphate, which comprises contacting a member selected from the group consisting of disodium phosphate, monosodium phosphate, phosphoric acid and mixtures thereof, with a preformed solution of alkaline water glass having an $SiO_2:Na_2O$ ratio between about 0.8–2.09:1 and sodium hypochlorite at a temperature sufficient to maintain the mixture in the molten state, said solution containing an amount of alkali sufficient for the formation of $Na_3PO_4$ and an alkali silicate having an $SiO_2:Na_2O$ ratio between about 2.5–6:1 upon reaction with said group member, 5–30% by weight of water glass being employed with respect to 5–50% by weight of said phosphate, the amount of alkali silicate being selected so as not to exceed about 25% by weight of the final product formed, allowing the molten reaction product formed to solidify, and recovering the alkali silicate-containing stable sodium hypochlorite and trisodium phosphate addition product formed.

2. Process according to claim 1, in which said solution contains an amount of alkali sufficient for the formation of an alkali silicate having an $SiO_2:Na_2O$ ratio between about 3.5–4.5:1.

3. Process according to claim 1, in which said alkali water glass has an $SiO_2:Na_2O$ ratio of less than 2.1.

4. Process according to claim 1, in which said solution contains an amount of water not substantially in excess of the amount necessary for the formation of trisodium phosphate-12-hydrate after said contacting.

5. Process according to claim 1, which includes comminuting the product formed.

6. Process according to claim 1, which includes adding a phosphate in a form ranging from incompletely hydrated to anhydrous to the melt prior to said solidification.

7. Process according to claim 6, in which said phosphate is added in an incompletely hydrated form and in which the melt contains a quantity of water sufficient for the hydration of the phosphate.

8. Process according to claim 6, in which said phosphate is a member selected from the group consisting of alkali salts of meta and polyphosphoric acid.

9. Process according to claim 8, in which said phosphates are added in amount of about 10–20% by weight.

10. Process according to claim 9 in which said addition is effected at a temperature between about 60 and 75° C.

11. An alkali silicate-containing stable addition product of sodium hypochlorite and trisodium phosphate-12-hydrate having the alkali silicate present with an $SiO_2:Na_2$ ratio between about 2.5–6:1 and formed by contacting disodium phosphate with a preformed solution of alkali water glass and a sodium hypochlorite, the amount of water glass in said preformed solution of alkali water glass being about from 5–30% by weight, the amount of disodium phosphate being from about 5–50% by weight, the amount of alkali silicate being selected so as not to exceed about 25% by weight of the alkali silicate-containing stable addition product of sodium hypochlorite and trisodium phosphate-12-hydrate formed.

12. Product according to claim 11, in which an alkali silicate has an $SiO_2:Na_2O$ ratio between about 3.5–4.5:1.

13. Product according to claim 11, in which said product has an active chlorine content of at least 2.2%.

14. Product according to claim 11, additionally containing a phosphate in a form ranging from incompletely hydrated to anhydrous added to the reaction product melt prior to solidification.

15. Product according to claim 13, in which said active chlorine content is above about 2.5%.

16. Product according to claim 14, in which said phosphate is present in amount not in excess of about 10–20% by weight.

17. Product according to claim 16, in which said phosphate is selected from the group consisting of alkali salts of meta and polyphosphoric acids.

18. The composition of matter consisting of an alkali silicate-containing stable addition product of sodium hypochlorite and trisodium phosphate dodecahydrate of the formula $(Na_3PO_4 \cdot 12H_2O)_n \cdot NaOCl$, said composition of matter being stable to storage and being formed from a mixture of sodium hypochlorite alkali silicate and a member selected from the group consisting of disodium phosphate, monosodium phosphate, phosphoric acid and mixtures thereof, said alkali silicate in said mixture gradually releasing the alkali necessary for the conversion of said phosphate into trisodium phosphate, whereby an excess of free alkali in said mixture is avoided, 5–30% by weight of alkali silicate being employed with respect to 5–50% by weight of phosphate, the amount of alkali silicate being selected so as not to exceed about 25% by weight of the final product formed.

References Cited in the file of this patent

UNITED STATES PATENTS

| | | |
|---|---|---|
| 1,555,474 | Mathias | Sept. 29, 1925 |
| 1,765,013 | Hershman | June 17, 1930 |
| 1,965,304 | Adler | July 3, 1934 |
| 1,966,383 | Elledge et al. | July 10, 1934 |
| 1,988,991 | Albertshauser | Jan. 22, 1935 |
| 2,034,361 | Sutton | Mar. 17, 1936 |
| 2,145,015 | Seaton | Jan. 24, 1939 |
| 2,324,302 | Hull | July 13, 1943 |
| 2,524,394 | Madorsky | Oct. 3, 1950 |
| 2,689,225 | Anderson et al. | Sept. 14, 1954 |

FOREIGN PATENTS

| | | |
|---|---|---|
| 721,083 | Germany | May 27, 1942 |
| 933,583 | Germany | Sept. 29, 1955 |